No. 779,238. Patented January 3, 1905.

UNITED STATES PATENT OFFICE.

HOSEA J. ROMICK, OF HILLIARD, OHIO.

RUST-PREVENTING COMPOUND.

SPECIFICATION forming part of Letters Patent No. 779,238, dated January 3, 1905.

Application filed September 21, 1904. Serial No. 225,391.

*To all whom it may concern:*

Be it known that I, HOSEA J. ROMICK, a citizen of the United States, residing at Hilliard, in the county of Franklin and State of Ohio, have invented a new and useful Rust-Preventive Compound, of which the following is a specification.

This invention relates to rust-preventive compounds.

The object of the invention is to provide a cheap and thoroughly efficient compound which will in a positive and certain manner protect metals subject to oxidation from rust, gases, and acids and which shall be elastic in character to permit such metals to be flexed without cracking or splintering the compound when applied.

The compound consists of the following ingredients, combined substantially in the proportions specified, by weight: red lead, eight parts; raw linseed-oil, eight parts; Japan drier, two parts; Portland cement, twenty-four parts; asbestos fiber, one-fourth part. These ingredients are thoroughly mixed in a suitable machine under the action of heat ranging from 100° to 120° Fahrenheit for a length of time just sufficient to secure thorough incorporation of the elements.

The ingredients are mixed as follows: The oil, drier, and asbestos are first combined and thoroughly mixed, then the lead is added, and the compound is again thoroughly mixed, and the Portland cement is finally added, and the mass is then agitated until the ingredients are all incorporated and the resulting compound presents a putty-like substance.

The compound may be applied to the article or material to be protected with a trowel or other suitable implement and is peculiarly adapted for protecting metallic roofs from rust, although it may be used in any other position where it would be of advantage.

Having thus described the invention, what is claimed is—

The herein-described compound consisting of the following ingredients in substantially the proportion specified by weight, red lead eight parts, raw linseed-oil eight parts, Japan drier two parts, Portland cement twenty-four parts and asbestos fiber one-fourth part.

In testimony that I claim the foregoing as my own I have hereto affixed my signature in the presence of two witnesses.

HOSEA J. ROMICK.

Witnesses:
C. A. ORRISON,
ELLA KOEHLER.